United States Patent
Chakra et al.

(10) Patent No.: US 10,528,610 B2
(45) Date of Patent: Jan. 7, 2020

(54) CUSTOMIZED CONTENT FOR SOCIAL BROWSING FLOW

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 14/530,411

(22) Filed: Oct. 31, 2014

(65) Prior Publication Data
US 2016/0124919 A1    May 5, 2016

(51) Int. Cl.
| | | |
|---|---|---|
| G06F 17/00 | (2019.01) | |
| G06F 16/35 | (2019.01) | |
| G06F 16/23 | (2019.01) | |
| G06F 16/28 | (2019.01) | |
| G06F 16/33 | (2019.01) | |
| H04L 29/08 | (2006.01) | |
| G06F 17/22 | (2006.01) | |

(52) U.S. Cl.
CPC .............. G06F 16/35 (2019.01); G06F 16/23 (2019.01); G06F 16/285 (2019.01); G06F 16/3331 (2019.01); H04L 67/30 (2013.01); *G06F 17/2235* (2013.01)

(58) Field of Classification Search
CPC ..................................................... G06F 17/22
See application file for complete search history.

(56) References Cited

U.S. PATENT DOCUMENTS

| | | | | |
|---|---|---|---|---|
| 6,434,599 B1* | 8/2002 | Porter | ................ | H04L 12/1818 709/204 |
| 6,446,113 B1* | 9/2002 | Ozzie | ................ | G06F 17/30168 707/E17.032 |
| 6,718,313 B1* | 4/2004 | Lent | ........................ | G06Q 30/06 705/35 |
| 6,732,364 B1* | 5/2004 | Bhaskaran | .............. | H04L 51/04 709/203 |
| 6,745,178 B1* | 6/2004 | Emens | .............. | G06F 17/30864 707/741 |
| 6,766,374 B2* | 7/2004 | Trovato | .............. | H04L 12/1818 348/E7.071 |

(Continued)

FOREIGN PATENT DOCUMENTS

WO     0157611 A2     8/2001

OTHER PUBLICATIONS

List of IBM Patents or Patent Applications Treated as Related, May 8, 2015, Total 2 pp.

(Continued)

*Primary Examiner* — Mustafa A Amin
(74) *Attorney, Agent, or Firm* — Konrad Raynes Davda & Victor LLP; Janaki K. Davda

(57) ABSTRACT

Provided are techniques for providing customized content for social browsing flow. In response to accessing existing content, a group is identified from a plurality of groups created from behavioral and profile analysis. Additional content is created for the existing content to provide a customized browsing experience based on the identified group. The additional content is displayed with the existing content.

12 Claims, 10 Drawing Sheets

(56) References Cited

U.S. PATENT DOCUMENTS

| | | | |
|---|---|---|---|
| 6,950,852 B1* | 9/2005 | Kobayaghi | H04L 29/06 709/204 |
| 6,957,383 B1* | 10/2005 | Smith | G06F 17/3089 707/999.1 |
| 7,047,279 B1* | 5/2006 | Beams | G09B 5/06 706/11 |
| 7,209,475 B1* | 4/2007 | Shaffer | H04M 3/4285 370/355 |
| 7,389,917 B2 | 6/2008 | Abraham et al. | |
| 7,454,470 B1* | 11/2008 | Isaacs | G06Q 10/107 709/206 |
| 7,542,902 B2* | 6/2009 | Scahill | G06F 17/30663 704/231 |
| 7,606,856 B2* | 10/2009 | Singh | G06F 17/30663 704/9 |
| 7,636,779 B2* | 12/2009 | Hayashi | G06F 17/30867 707/999.003 |
| 7,970,664 B2* | 6/2011 | Linden | G06Q 30/02 705/26.1 |
| 8,190,601 B2 | 5/2012 | Ahari et al. | |
| 8,364,755 B2 | 1/2013 | Olson et al. | |
| 8,478,780 B2 | 7/2013 | Cooper et al. | |
| 8,819,536 B1* | 8/2014 | Lucovsky | G06Q 10/10 715/205 |
| 8,880,996 B1* | 11/2014 | Deshpande | G06Q 30/0255 715/234 |
| 2001/0056465 A1* | 12/2001 | Aiso | G06Q 10/107 709/203 |
| 2002/0103647 A1* | 8/2002 | Houplain | G10L 15/26 704/260 |
| 2002/0138331 A1 | 9/2002 | Hosea et al. | |
| 2002/0152101 A1* | 10/2002 | Lawson | G06Q 10/025 705/6 |
| 2003/0021238 A1* | 1/2003 | Corneliussen | H04M 3/567 370/260 |
| 2003/0023677 A1* | 1/2003 | Morison Zuill | G06Q 10/10 709/203 |
| 2003/0070176 A1* | 4/2003 | Parker | G06Q 10/10 725/105 |
| 2003/0135565 A1* | 7/2003 | Estrada | G06Q 10/107 709/206 |
| 2003/0225833 A1* | 12/2003 | Pilat | G06Q 10/107 709/204 |
| 2004/0083263 A1* | 4/2004 | Richardson | H04L 63/0428 709/204 |
| 2004/0098449 A1* | 5/2004 | Bar-Lavi | H04L 29/06027 709/202 |
| 2004/0260701 A1* | 12/2004 | Lehikoinen | G06F 17/3089 |
| 2004/0267730 A1* | 12/2004 | Dumais | G06F 17/30613 |
| 2005/0086211 A1* | 4/2005 | Mayer | H04L 51/04 |
| 2005/0125246 A1* | 6/2005 | Muller | G06Q 10/10 705/300 |
| 2005/0144228 A1* | 6/2005 | Rokosz | G06Q 10/107 709/204 |
| 2005/0154693 A1* | 7/2005 | Ebert | G06Q 10/10 |
| 2005/0171799 A1* | 8/2005 | Hull | G06Q 10/107 705/319 |
| 2005/0276479 A1* | 12/2005 | Goldberg | G06Q 10/10 382/181 |
| 2006/0026113 A1 | 2/2006 | Omoigui | |
| 2006/0080432 A1* | 4/2006 | Spataro | H04L 12/1831 709/224 |
| 2006/0143214 A1* | 6/2006 | Teicher | A63F 13/12 |
| 2006/0167747 A1* | 7/2006 | Goodman | G06Q 30/02 705/14.53 |
| 2006/0176831 A1* | 8/2006 | Greenberg | H04L 12/581 370/260 |
| 2006/0190448 A1* | 8/2006 | Bartek | G06F 16/954 |
| 2006/0218577 A1* | 9/2006 | Goodman | G06Q 30/02 725/32 |
| 2007/0016585 A1* | 1/2007 | Nickell | G06F 17/30864 |
| 2007/0073810 A1* | 3/2007 | Adams | G06Q 10/107 709/205 |
| 2007/0083520 A1* | 4/2007 | Shellen | G06F 17/3089 |
| 2007/0112965 A1* | 5/2007 | Eftis | H04L 12/581 709/227 |
| 2007/0116227 A1* | 5/2007 | Vitenson | H04M 3/4878 379/207.02 |
| 2008/0005067 A1 | 1/2008 | Dumais et al. | |
| 2008/0115068 A1* | 5/2008 | Smith | H04L 12/1813 715/758 |
| 2008/0235018 A1* | 9/2008 | Eggen | G10L 15/26 704/251 |
| 2009/0070426 A1 | 3/2009 | McCauley et al. | |
| 2009/0164926 A1* | 6/2009 | Boyle | G06F 17/30867 715/764 |
| 2010/0205541 A1* | 8/2010 | Rapaport | G06Q 10/10 715/753 |
| 2010/0241488 A1* | 9/2010 | Jacobson | G06Q 30/0205 705/7.34 |
| 2011/0320441 A1 | 12/2011 | Lee et al. | |
| 2014/0020115 A1* | 1/2014 | Le Chevalier | G06F 17/30014 726/28 |
| 2014/0164893 A1* | 6/2014 | Pariente | G06F 17/30896 715/207 |
| 2015/0095329 A1* | 4/2015 | Sanio | G06F 17/30038 707/732 |

OTHER PUBLICATIONS

Preliminary Amendment, May 8, 2015, for U.S. Appl. No. 14/707,865, filed May 8, 2015 by A. Chakra et al., Total 5 pp.

U.S. Appl. No. 14/707,865, filed May 8, 2015 entitled, "Customized Content for Social Browsing Flow", invented by A. Chakra et al., Total 34 pp.

Google, "Google Search Appliance Help", [online], [Retrieved on Dec. 4, 2014]. Retrieved from the Internet at <URL: https://support.google.com/gsa/#/topic=2707703>, © Google 2014, Total 1 p.

Google, "Google Search Appliance—Google Developers", [online], [Retrieved on Dec. 4, 2014]. Retrieved from the Internet at <URL: https://developers.google.com/search-appliance/>, last updated Jun. 19, 2014, Total 1 p.

The Dataportability Project, "DataPortability Project", © 2014 The DataPortability Project, Total 5 pp.

Bernstein, M.S., B. Suh, L. Hong, J. Chen, S. Kairam, and E.H. Chi, "Eddi: Interactive Topic-based Browsing of Social Status Streams", UIST'10, Oct. 3-6, 2010, New York, New York, USA, © 2010 ACM, Total 10 pp. (Also available at: http://hci.stanford.edu/publications/2010/eddi/eddi-uist2010.pdf.).

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computingicloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Office Action 1, dated Jul. 1, 2016, for U.S. Appl. No. 14/707,865, filed May 8, 2015 by A. Chakra et al., Total 18 pp.

Response to Office Action 1, dated Sep. 29, 2016, for U.S. Appl. No. 14/707,865, filed May 8, 2015 by A. Chakra et al., Total 8 pp.

Final Office Action, dated Jan. 6, 2017, for U.S. Appl. No. 14/707,865, filed May 8, 2015 by A. Chakra et al., Total 12 pp.

Response to Final Office Action, dated Apr. 5, 2017, for U.S. Appl. No. 14/707,865, filed May 8, 2015 by A. Chakra et al., Total 7 pp.

Office Action dated May 12, 2017, pp. 12, for U.S. Appl. No. 14/707,865, filed May 8, 2015.

Response dated Jul. 21, 2017, pp. 7, to Office Action dated May 12, 2017, for U.S. Appl. No. 14/707,865, filed May 8, 2015.

Final Office Action 2, dated Nov. 2, 2017, for U.S. Appl. No. 14/707,865, filed May 8, 2015 by A. Chakra et al., Total 14 pp.

Response to Final Office Action 2, dated Feb. 1, 2018, for U.S. Appl. No. 14/707,865, filed May 8, 2015 by A. Chakra et al., Total 10 pp.

(56) References Cited

OTHER PUBLICATIONS

Office Action 5, dated Mar. 22, 2018, for U.S. Appl. No. 14/707,865, filed May 8, 2015 by A. Chakra et al., Total 21 pp.
Response to Office Action 5, dated Jun. 22, 2018, for U.S. Appl. No. 14/707,865, filed May 8, 2015 by A. Chakra et al., Total 18 pp.
Final Office Action 3 for U.S. Appl. No. 14/707,865, pp. 15, dated Oct. 12, 2018.
Response to Final Office Action 3 for U.S. Appl. No. 14/707,865, pp. 11, dated Jan. 9, 2019.
Office Action 7, dated Mar. 19, 2019, for U.S. Appl. No. 14/707,865, 17 pp.
Response to Office Action 7, dated Jun. 18, 2019, for U.S. Appl. No. 14/707,865, 9 pp.
Notice of Allowance 1 for U.S. Appl. No. 14/707,865, 9 pp., dated Aug. 30, 2019.

* cited by examiner

CUSTOMIZED CONTENT FOR SOCIAL BROWSING FLOW

FIELD

Embodiments of the invention relate to customized content for social browsing flow.

BACKGROUND

At present, static web pages are provided that have pre-defined links that may be selected to view different content. These static web pages are viewed by navigating through the web pages as desired.

SUMMARY

Provided is a method for providing customized content for social browsing flow. The method comprises: in response to accessing existing content, identifying, using a processor of a computer a group from a plurality of groups created from behavioral and profile analysis; creating additional content for the existing content to provide a customized browsing experience based on the identified group; and displaying the additional content with the existing content.

Provided is a computer program product for providing customized content for social browsing flow. The computer program product comprises a computer readable storage medium having program code embodied therewith, the program code executable by at least one processor to perform: in response to accessing existing content, identifying a group from a plurality of groups created from behavioral and profile analysis; creating additional content for the existing content to provide a customized browsing experience based on the identified group; and displaying the additional content with the existing content.

Provided is a computer system for providing customized content for social browsing flow. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: in response to accessing existing content, identifying a group from a plurality of groups created from behavioral and profile analysis; creating additional content for the existing content to provide a customized browsing experience based on the identified group; and displaying the additional content with the existing content.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
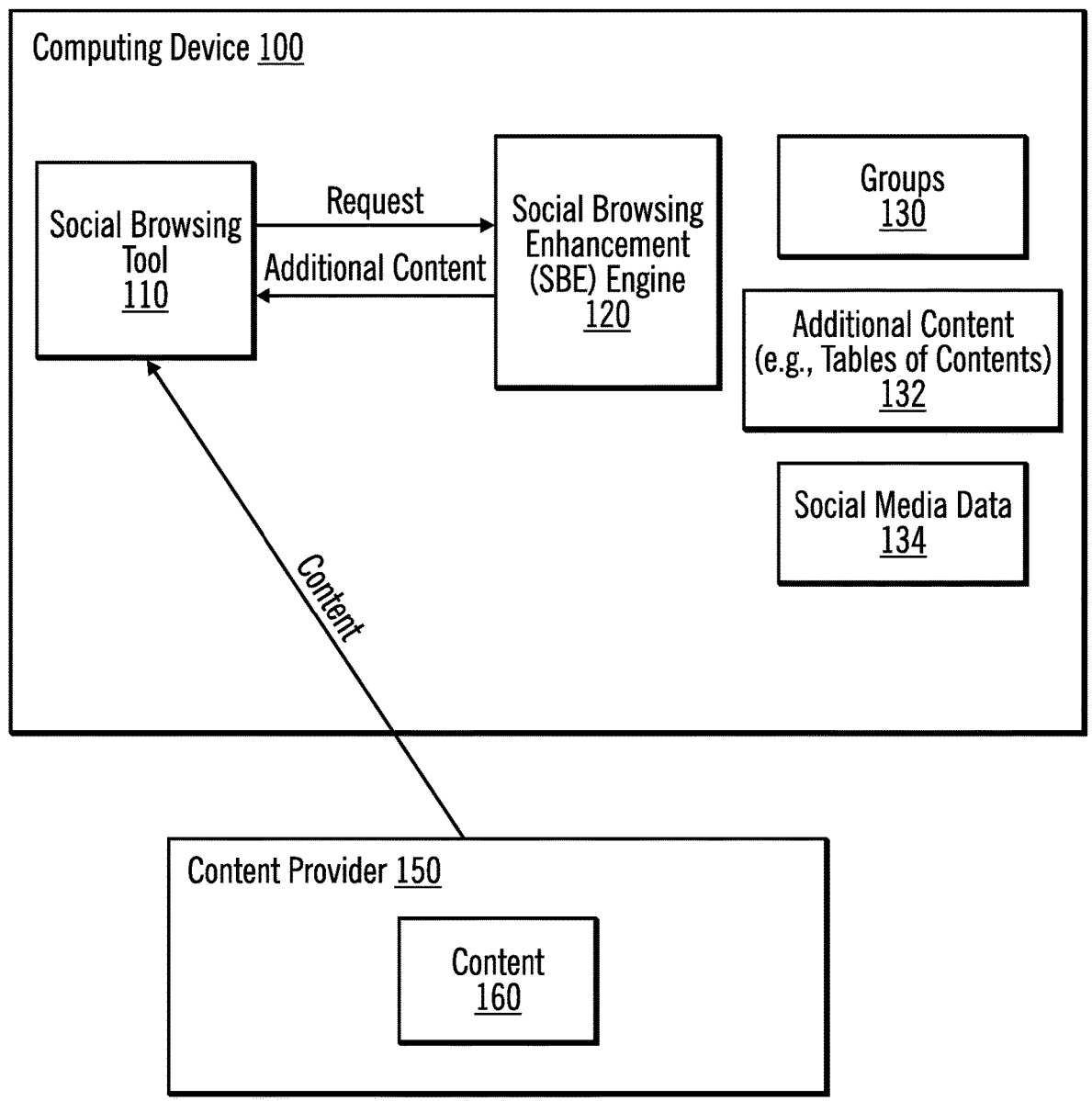
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes a social browsing tool 110, a Social Browsing Enhancement engine 120, groups 130 (e.g., logical groupings), additional content (e.g., tables of content) 132, and social media data 134.

The groups 130 may be referred to as "contexts" as the groups 130 are identified based on the context of activities of a plurality of users.

The computing device 100 is coupled to a content provider 150 (e.g., another computing device (such as a web server), a data store, etc.) either directly or indirectly (e.g., via a network (such as the Internet)). The content provider 150 has content 160 (e.g., web pages, documents, blogs, electronic mails (e-mails), text messages, instant messages, or any other electronic content that is searchable). The social browsing tool 110 may be described as a search engine that tracks internet browsing that is influenced by social media memberships. For example, if a user is reading or writing a blog, such access to the blog may be tracked, as well as, the content of the blog for later use in associating a user with a group.

In certain embodiments, the social browsing tool 110 obtains content (e.g., existing (which may also be referred to as "original") content 160) from the data store 150, sends a request to the SBE engine 120 to obtain additional content from the SBE engine 120, and displays the existing content and the additional content.

The SBE engine 120 organizes content of a web site based on group web site viewing behavior on a topic. In certain embodiments, an individual/group may decide that this is to be done and initiates such content organization. In alternative embodiments, such content organization is performed as a default. Then, as users consume content on the web site, the SBE engine 120 summarizes the content that is viewed and, optionally, creates additional content in the form of a new table of contents (which may be referred to as a set of "logical headings") for social network consumption. Then, a user may select a group 130, and the SBE engine 120 provides a modified web site with a new table of contents.

The SBE engine 120 dynamically manages content dependent on social browsing experience, which allows fast tracking to the content that is most relevant to users. For example, if a source of information is a 10,000 page electronic book ("e-book"), the SBE engine 120 creates a table of contents based on interaction of many users with the electronic book. The SBE engine 120 also organizes content that users are browsing/searching internally through a business network.

Figure 2:
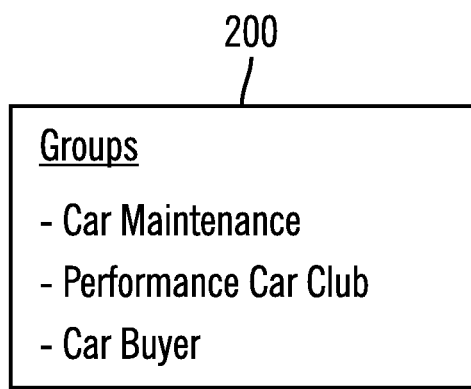
FIG. 2 illustrates example groups in accordance with certain embodiments.

FIG. 2 illustrates example groups 200 for a car web site in accordance with certain embodiments. In certain embodiments, the SBE engine 120 identifies groups based on data from social networks. In FIG. 2 the groups are: Car Maintenance, Performance Car Club, and Car Buyer.

Figure 3:
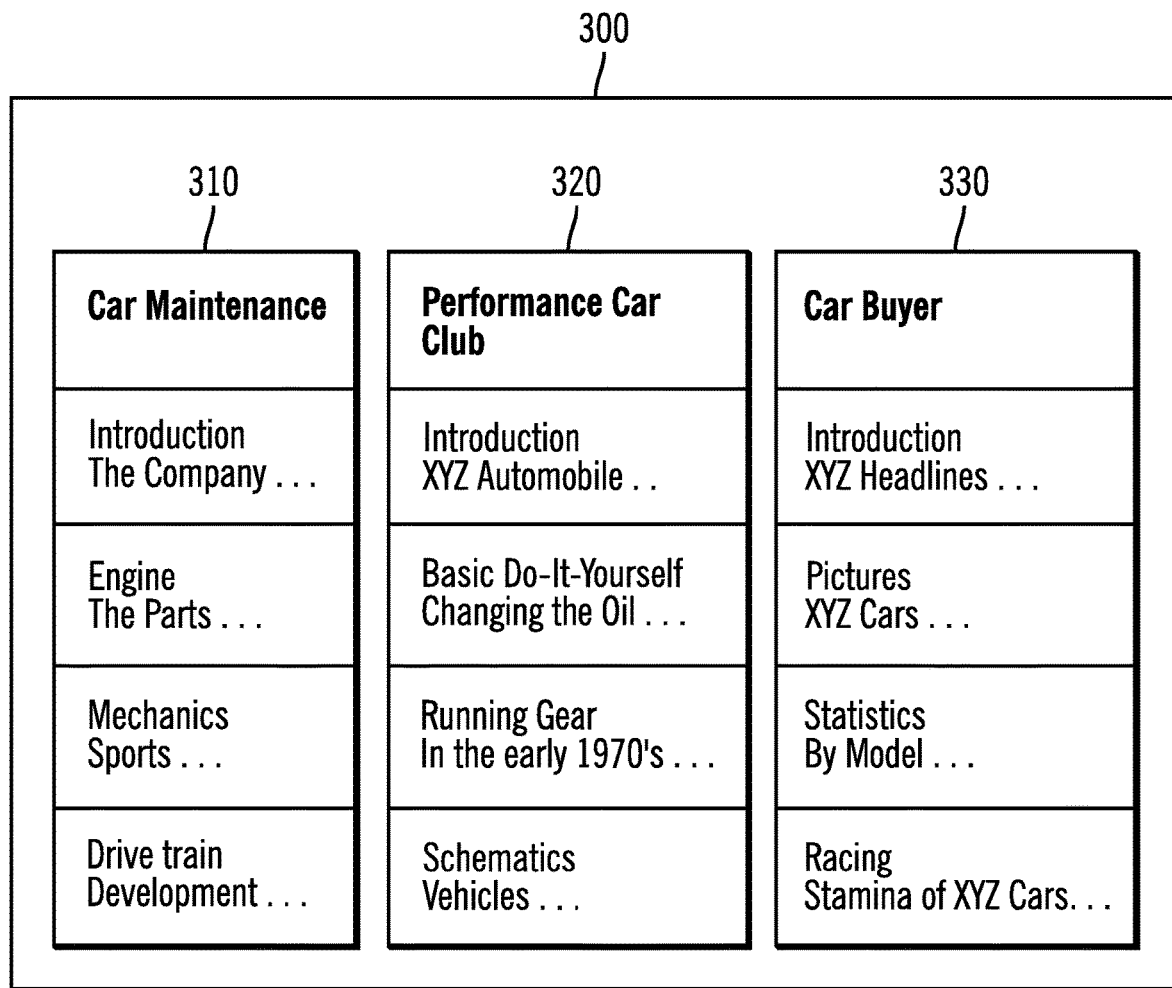
FIG. 3 illustrates an example table of contents in accordance with certain embodiments.

FIG. 3 illustrates example tables of contents 300 in accordance with certain embodiments. For example, different groups of users will navigate a web site in different ways, so the SBE engine 120 determines how users from specific groups (e.g., social circles) usually browse the content of a web site and generates a specific table of contents for each of the groups. With reference to FIG. 3, the groups are: Car Maintenance (e.g., which may be of interest to an engineer), Performance Car Club (e.g., which may be of interest to an owner), and Car Buyer (e.g., which may be of interest to a student). In FIG. 3, each group has a separate, additional content 310, 320, 330 (e.g., a separate, additional table of contents). Each of the additional content 310, 320, 330 provides four headings, with summaries of the content under the headings.

In certain embodiments, the SBE engine 120 crawls further into the user's profile (e.g., performs behavioral and profile analysis) and finds out that the user is an engineer, an owner, a student, etc., and provides customized content (e.g., a customized table of contents). For example, if the user is identified as an engineer, the SBE engine 120 determines that the engineer is likely to be interested in Car Maintenance and displays additional content for the Car Maintenance group.

Users consume content in different ways and have different reasons for consuming web pages. As an example of how different users navigate the same web page, an engineer may select a Pictures link in the web page in order to see pictures of the car's engine to understand how the engine works and how the engine differs from engines of other brands; a car owner may select a Models link in the same web page to drill down into more information and find out how to change the car's oil; and a student may select a Pictures link in the same web page to look at pictures of the car for possible purchase.

In certain embodiments, the customized content may be dynamically incorporated into existing content available on the web page (e.g., an existing menu or an existing table of contents) or may be offered as a window that is overlaid on the web page or displayed alongside the web page so that the user can open or hide the window as desired.

In certain embodiments, the dynamic implementation compares the existing headings in an original table of contents against the suggested headings in the customized table of contents. Then, the SBE engine 120 performs a gap analysis to remove entries in the existing table of contents or add entries to the existing table of contents to create additional, related content.

With embodiments, the SBE engine 120 dynamically creates additional content (e.g., tables of contents) for web pages based on group viewing behavior. For example, if a user views a web page, the SBE engine 120 knows from the user's status associated with one or more social media applications that this user is part of a car club. Then, the SBE engine 120 may use this information to determine that the user may be interested in content for a Performance Car Club group. Also, this information about the user being in part of a car club may be stored in the social media data 134. The browsing behavior of the user is recorded (stored) and, over time, the SBE engine 120 dynamically offers a group of users in the car club the ability to accept a new experience of the web site. In particular, when each member of a car club navigates to a particular web page, the SBE engine 120 offers the user an experience based on group social browsing flow and behavior at that web site.

Figure 4:
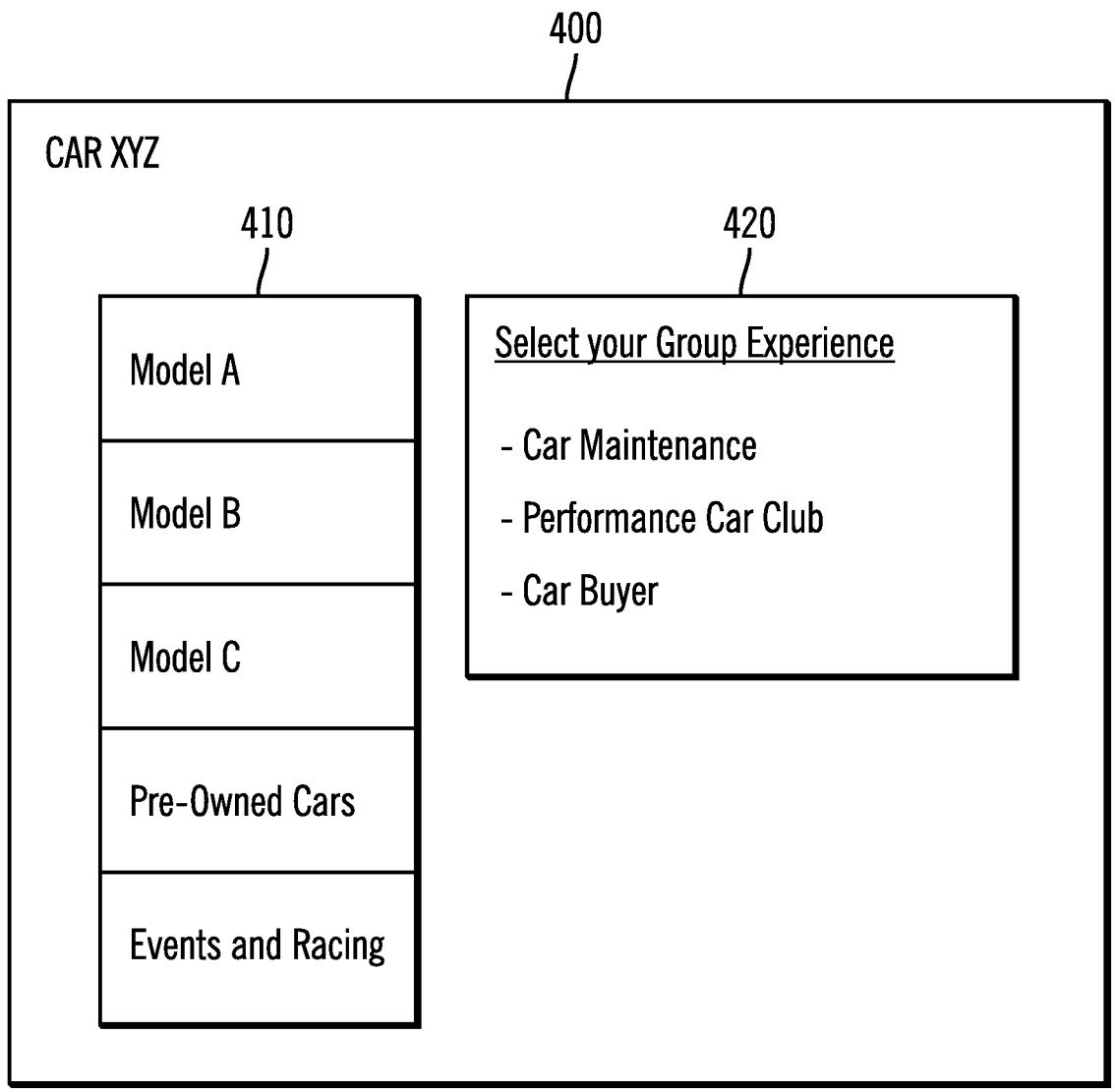
FIG. 4 illustrates a web page of a web site for a Car XYZ in accordance with certain embodiments.

FIG. 4 illustrates a web page 400 of a web site for a Car XYZ in accordance with certain embodiments. In FIG. 4, "Car XYZ" represents a brand of a car. The web page 400 provides links 410 for: Model A, Model B, Model C, Pre-Owned Cars, and Events and Racing. In addition, the SBE engine 120 provides group selection 420. With group selection, a user may select a group for viewing the web page 400. The group selection may be provided in a pop-up box, as a drop-down menu, etc. In certain alternative embodiments, the SBE engine 120 automatically determines a group for the user.

In FIG. 4, the web page 400 has an image automatically inserted for group selection 420 and, if the user selects a group from the group selection 420, the SBE engine 120 updates the web page 400 (e.g., the user is brought to the Performance Car Club page that is not usually prominent on this web site). In certain embodiments, the SBE engine 120 removes links and inserts links in the set of pre-defined links.

With reference to the example of FIG. 4, a car owner is viewing the web page 400 and selects a Performance Car Club group.

Figure 5:
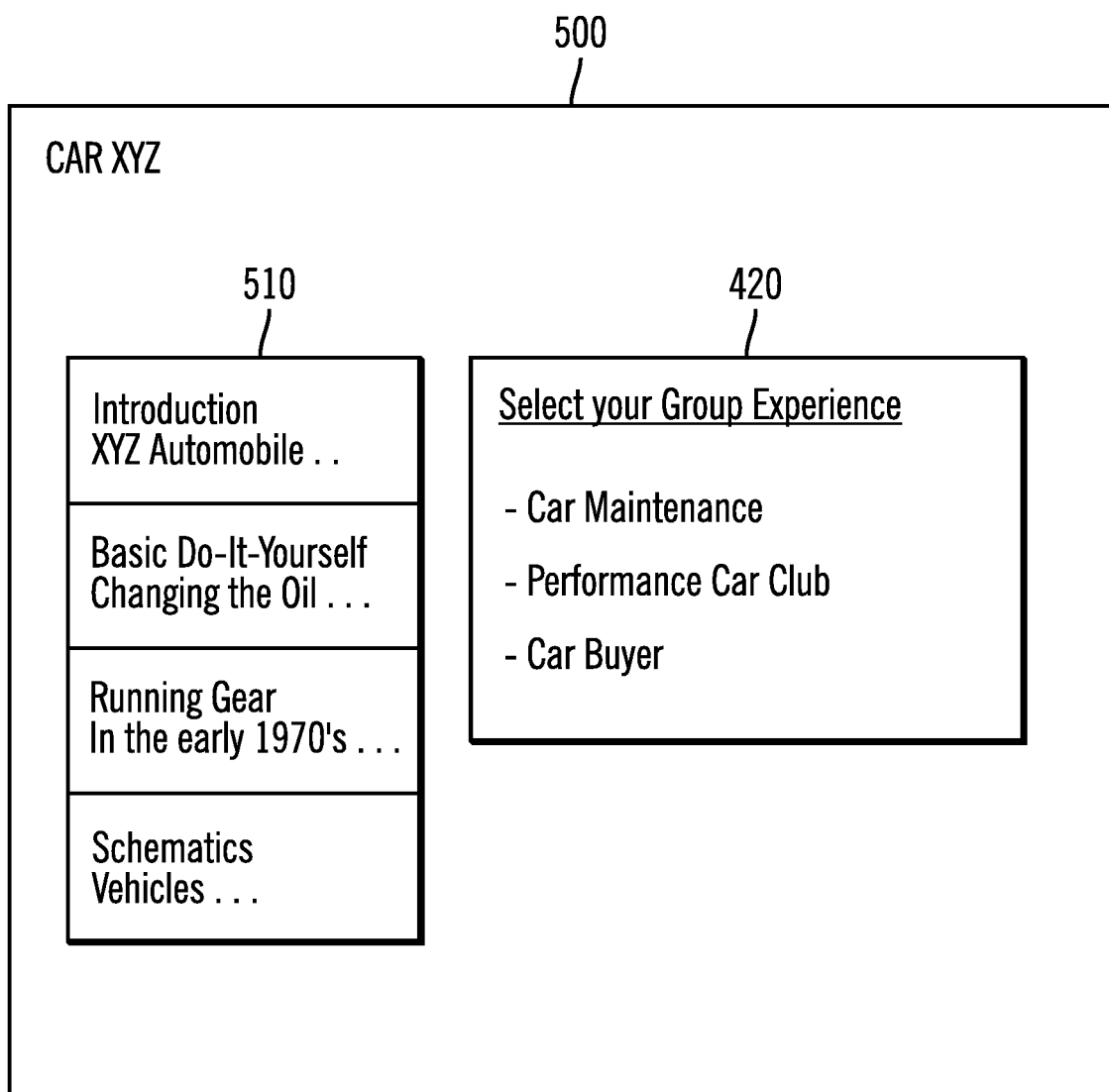
FIG. 5 illustrates a modified version of a web page of a web site in accordance with certain embodiments.

FIG. 5 illustrates a modified version of a web page 500 of a web site in accordance with certain embodiments. If a user selects the Performance Car Club group in the group selection 420 of FIG. 4, the SBE engine 120 displays updated web page 500 of FIG. 5. In particular, the SBE engine 120 removes links from and adds links to the links 410 (FIG. 4) to provide the additional content 510 and to enable a user to have a different experience with the web page based on the browsing behavior and/or social browsing flow of other users interested in car maintenance.

In certain embodiments, the social browsing tool 110 defines the type of user browsing this content (e.g., through the user's social network, through plug-ins to the social browsing tool, through plug-ins to social media applications, etc.) or the type of user may be defined manually (e.g., when the user starts a web session or goes to a web site or web page).

Social media applications include, for example, a social media bot (e.g., representing a chatbot, blogs, posts, Rich Site Summary (RSS) feeds, wikis, microblogging services (e.g., that issue broadcast messages), social networking services (e.g., for data sharing), voice recognition systems, Artificial Intelligence (AI) systems, Instant Message (IM) systems, sametime systems, Short Message Service (SMS) systems, enterprise software service, self-help service, etc.

Figure 6:
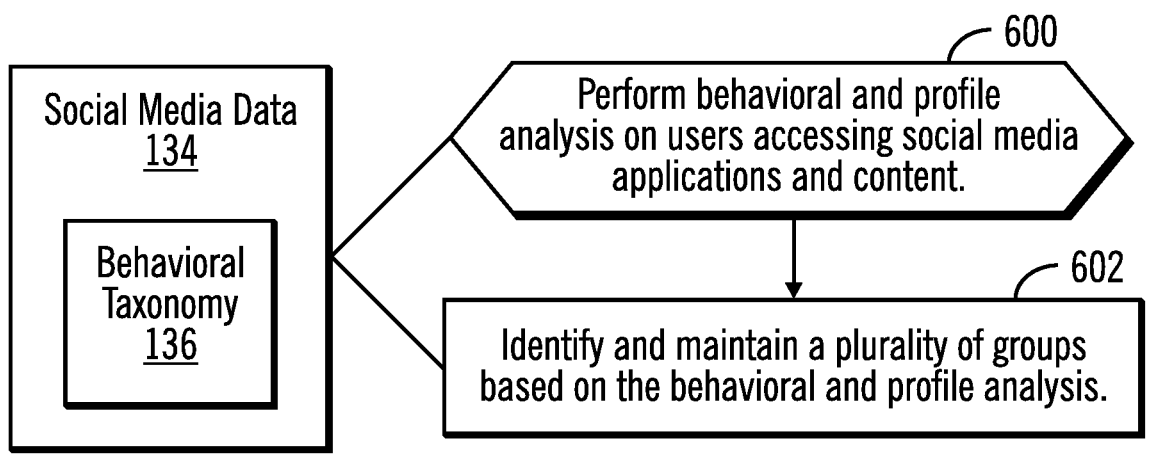
FIG. 6 illustrates, in a flow diagram, operations for creating groups in accordance with certain embodiments.

FIG. 6 illustrates, in a flow diagram, operations for creating groups in accordance with certain embodiments. Control begins at block 600 with the SBE engine 10 performing behavioral and profile analysis on users accessing social media applications and content. Behavioral and profile analysis may include monitoring behaviors that may be categorized as a group member or perspective or using behaviors of multiple users to form a group with users having common behaviors and/or profiles. In block 602, the SBE engine identifies and maintains a plurality of groups based on the behavioral and profile analysis.

Figure 7:
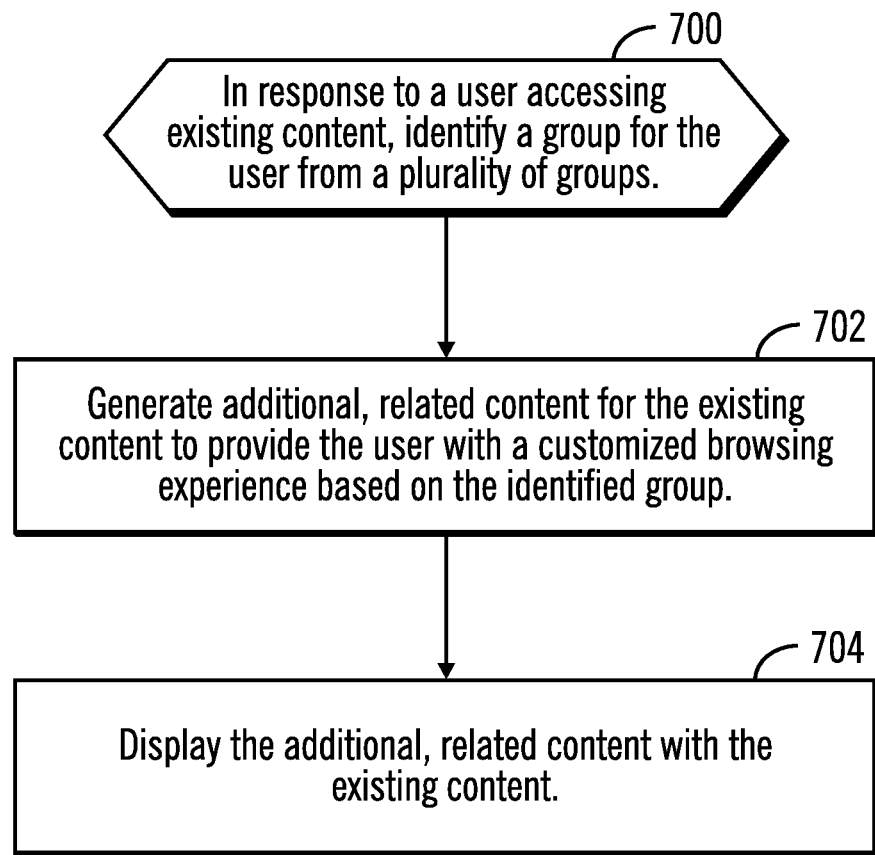
FIG. 7 illustrates, in a flow diagram, operations for updating content for a customized browsing experience in accordance with certain embodiments.

FIG. 7 illustrates, in a flow diagram, operations for updating content for a customized browsing experience in accordance with certain embodiments. Control begins at block 700, in response to a user accessing existing content (e.g., a web page), the SBE engine 120 identifies a group for the user from a plurality of groups. In certain embodiments, the SBE engine 120 uses the social media data 134 to identify the group. In certain other embodiments, the SBE engine 120 provides a User Interface (UI) (e.g., group selection 420) to allow the user to select the group. In block 702, the SBE engine 120 generates additional, related content to provide the user with a customized browsing experience. Generating the additional, related content may include creating this content or retrieving different content (e.g., created by a system administrator and associated with the group). In certain embodiments, the SBE engine 120 creates the additional, related content (e.g., a new table of contents) based on a classification in the existing content and based on predicted user behavior associated with belonging to a particular (e.g., social network) group. In certain embodiments, to create the additional, related content, the SBE engine 120 modifies the original table of contents of a web page to provide the customized browsing experience. In block 704, the SBE engine 120 displays the additional, related content with the existing content. The additional, related content may be displayed in a window that is overlaid on the existing content or displayed adjacent to or near to the existing content.

In certain embodiments, the groups are ascertained over time. Initially, the SBE engine 120 may perform an upfront behavioral and profile analysis (e.g., UserA has "IT Architect" in their profile name and is a member of several communities with "IT Architect" in the description so in an initial analysis, that user is associated with the "IT Architect" group). As the SBE engine 120 monitors the users' behavior and group, the SBE engine 120 may associate a user with a different group (e.g., UserA may be associated with the "Government IT Architect" group because UserA has reached a threshold in behavior that matches the behavior of entities in that group). This grouping is dynamic as the associated group may change on what the user is doing. In certain embodiments, where the group of the user is ambiguous, the SBE engine provides a UI that lists (e.g., in descending order) the likely roles/groups that may be appropriate for the user at a specific time.

With embodiments, the analysis is detailed using a behavioral taxonomy 136 and is associated with a preference for content. For example, the behavioral taxonomy 136 may include information on users, such as: UserA in group1 is looking for x; UserA in group2 wants to comment on specific content; UserA in group3 communicates with UserB in social environment2; UserA is also a member of communityXYZ. For each group, there is a list of behaviors and attributes that is used to differentially weight whether a particular user is likely to be a member of that group. Thus, behavioral taxonomy 136 may be described as the result of monitoring behaviors that could be categorized as a group member or perspective.

The application of changed content, is not limited to the content on a web page, but may also infer the behavior of a mobile device or a cloud based platform (e.g. some users may additionally see activities, blogs, instant messages, and other applications).

For example, if a community called "Creativity" is create, then, UserA, who is a Client Facing Management Consultant, may have a different experience than userB, who is a first line manager. So UserA can automatically, or elect to, benefit from the social browsing flow and behaviors of dynamically created behavioral groups.

In certain embodiments, the SBE engine 120 provides a User Interface (UI) component that allows a user to switch from a custom experience of a web site or web page to the original experience of that web site or web page.

With embodiments, if a user navigates web sites and web pages using a search engine and/or by selecting links between web sites and web pages, and if the user is logged into a social media application at the time, the SBE system 120 monitors what the user does by taking in cookies, browse history, page hits, etc. In certain embodiments, this may be referred to as a user's social browsing flow.

The SBE system 120 may also record browser behavior that indicates which areas of the page provide the most interest to different types of user (e.g., engineer, owner, student, etc.). For example, if a user goes to a web page and uses a find operation (e.g., CTRL+F) to locate "oil change", the SBE engine 120 may capture this information as browser behavior.

In certain embodiments, the SBE system 120 analyzes the user's social browsing flow and browser behavior (e.g., the social media application log in, social groups, cookies, active monitoring, page navigation, search terms input to the search engine, etc.) to identify one or more groups for the user (e.g., engineer, owner, student, etc.).

Once the group is identified, the SBE engine 120 locates the table of contents for the group. From the table of contents, the SBE engine 120 identifies what the user is most interested in (e.g., 3 web pages out of 25 web pages of a web site).

Over time, the SBE engine 120 accumulates the social browsing flow and browser behavior of many users and uses this information to determine groups. The groups provide an indication of why the users in that group view a particular web site and how they navigate that web site. Using this information, the SBE engine 120 prepares a customized table of contents for each group. The SBE engine 120 offers the customized table of contents to each user. The customized table of contents is intended to better capture topics that the user in the group is interested in and provides a summary of each topic. For example, each time an engineer navigates to a web site, the engineer is offered a custom table of contents for engineers.

With embodiments, the SBE engine 120 offer users recommendations of new links (e.g., using a spider to locate links). For example, if users move from a first car web site to a second car web site, then, the SBE engine 120 may link to the second car web site, which may be on an external site.

The SBE engine 120 presents content based on patterns of access associated with user demographic group including: monitoring a plurality of users' web site accesses; using Natural Language Processing (NLP) against profiles for the plurality of users and content on web sites; applying analytical analysis to associate demographic group with patterns of access on a web site; and, in response to detecting a user accessing a web site and a demographic group for the user, presenting content for the web site to the user according to the patterns of access associated with the demographic group. The profiles may be described as data about groups or perspectives for which the customized, additional content is tailored. The content presented to the user is adjusted based on the demographic group. The adjust content may include a table of contents (TOC). The demographic group is selected from a group consisting of student, teacher, professional, amateur, enthusiast, engineer, follower, etc. A user interface allows the user to select the demographic group.

Thus, embodiments provide a social browsing flow and customized web site and web page browsing experience. Embodiments generate dynamic tables of contents for user specific requirements based on group membership.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
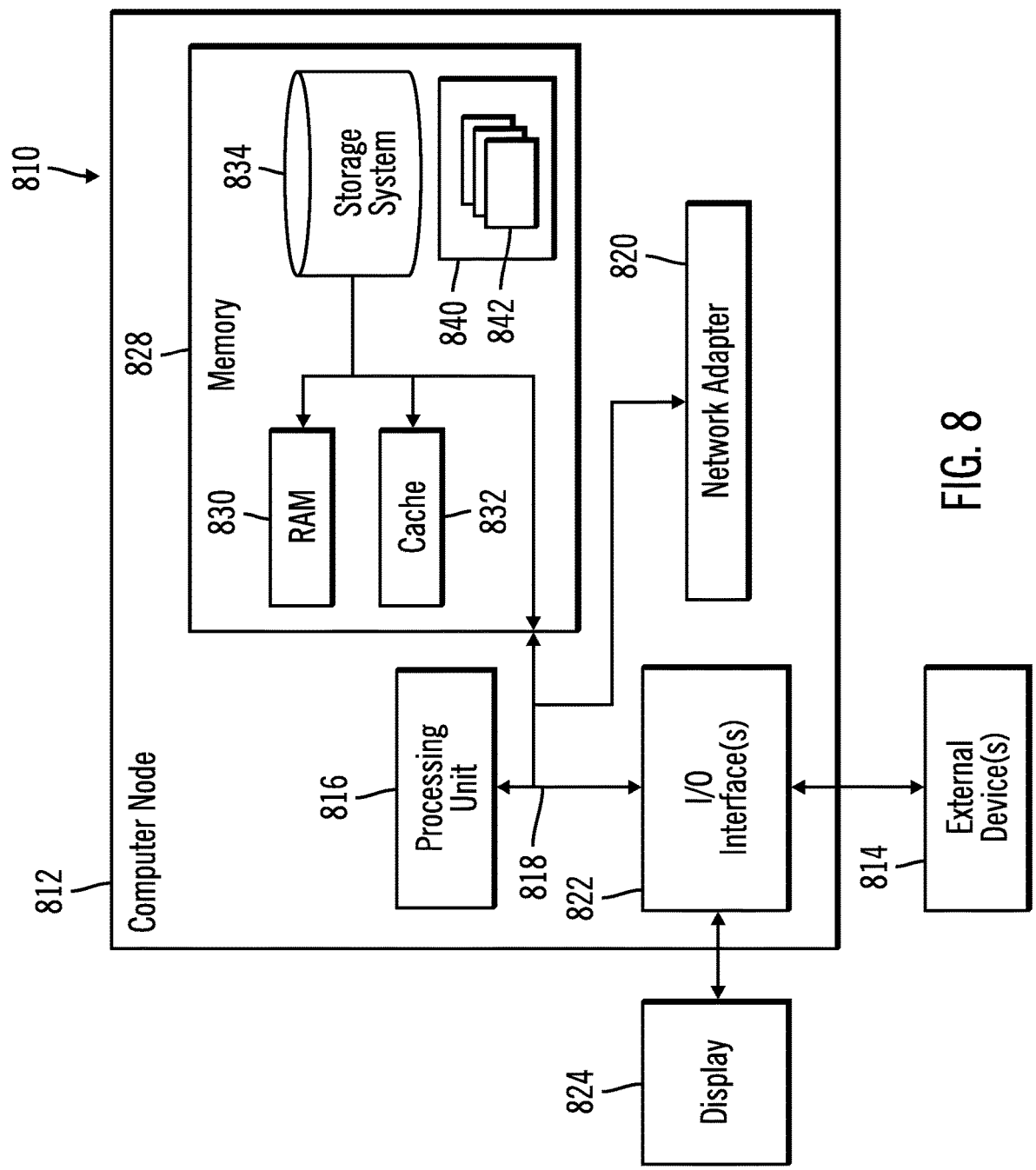
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general group of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
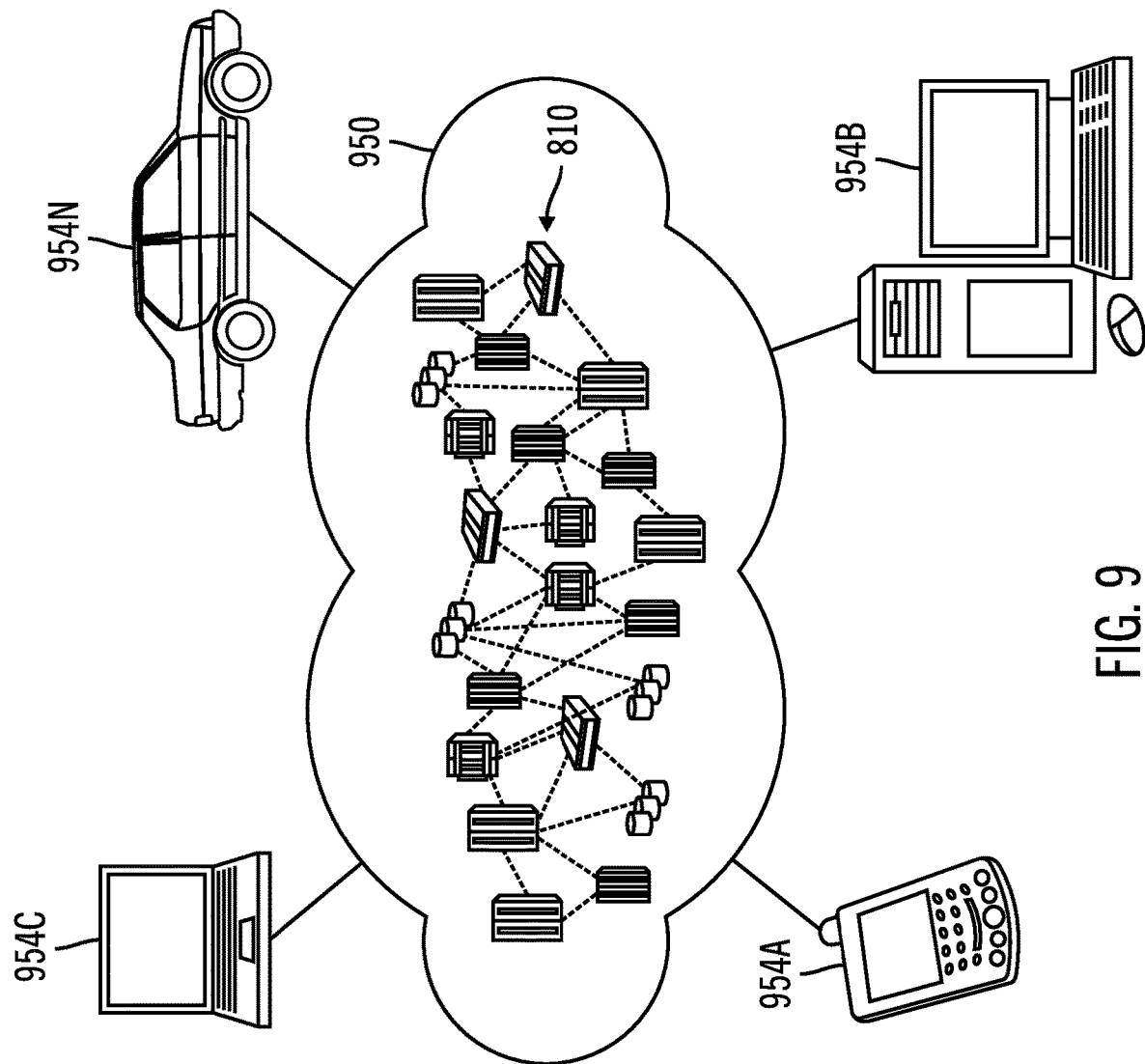
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
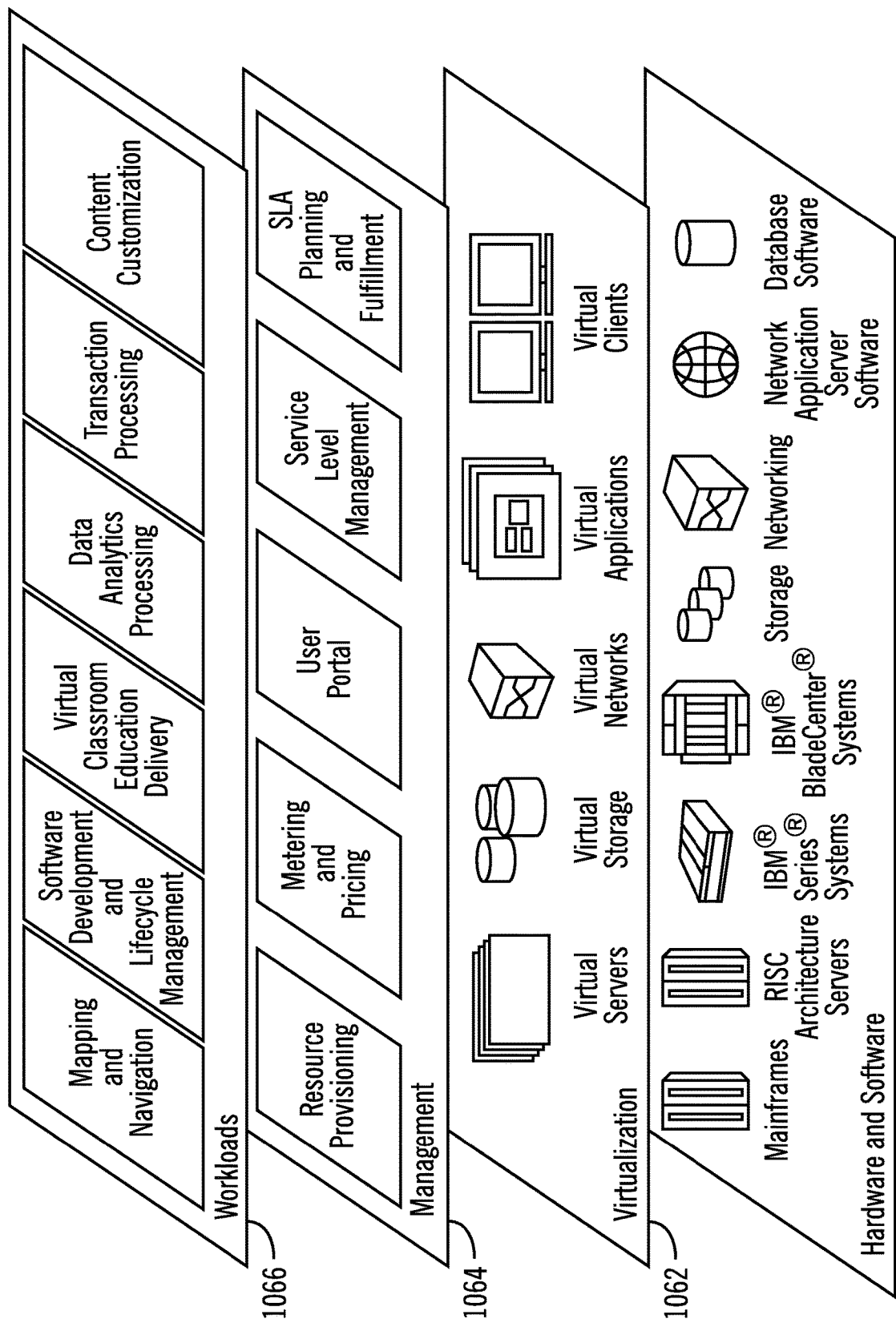
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and content customization.

Thus, in certain embodiments, software or a program, implementing content customization in accordance with embodiments described herein, is provided as a service in a cloud environment.

In certain embodiments, the computing device 100 has the architecture of computing node 810. In certain embodiments, the computing device 100 is part of a cloud environment. In certain alternative embodiments, the computing device 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable cable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform operations for:
    performing behavioral and profile analysis based on user profiles and by tracking users access to social media applications and web content;
    identifying a plurality of groups based on the behavioral and profile analysis, wherein a list of behaviors and attributes that are used to differentially weight whether a particular user is likely to be a member of a particular group are associated with each group of the plurality of groups;
    determining how members of each group of the plurality of groups browse a web site having multiple web pages;
    based on the determination, creating a first table of contents for a first group of the plurality of groups and a second table of contents for a second group of the plurality of groups, wherein the first table of contents and the second table of contents provide access to different web pages of the web site, and wherein the first table of contents and the second table of contents are available at a same time for the web site;
    in response to a user accessing existing content of the web site having the multiple web pages, identifying one of the first group and the second group from the plurality of groups using the list of behaviors and attributes associated with each group of the plurality of groups, wherein the identification of one of the first group and the second group changes over time;
    in response to the first group being identified at a first time, updating an existing table of contents to modify entries based on the first table of contents;
    in response to the second group being identified at a second time, updating the existing table of contents to modify entries based on the second table of contents; and
    displaying the updated, existing table of contents.

2. The computer program product of claim 1, wherein the program code is executable by the at least one processor to perform operations for:
    dynamically updating the plurality of groups; and
    in response to the user accessing the existing content, identifying a new group from the dynamically, updated plurality of groups.

3. The computer program product of claim 1, wherein the program code is executable by the at least one processor to perform operations for:
    modifying the existing table of contents by at least one of adding a link and removing a link from the existing table of contents.

4. The computer program product of claim 1, wherein the program code is executable by the at least one processor to perform operations for:
    using social media data to identify one of the first group and the second group.

5. The computer program product of claim 1, wherein the program code is executable by the at least one processor to perform operations for:
    receiving a selection of one of the first group and the second group.

6. The computer program product of claim 1, wherein a Software as a Service (SaaS) is configured to perform the operations of the computer program product.

7. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
    performing behavioral and profile analysis based on user profiles and by tracking users access to social media applications and web content;
    identifying a plurality of groups based on the behavioral and profile analysis, wherein a list of behaviors and attributes that are used to differentially weight whether a particular user is likely to be a member of a particular group are associated with each group of the plurality of groups;
    determining how members of each group of the plurality of groups browse a web site having multiple web pages;
    based on the determination, creating a first table of contents for a first group of the plurality of groups and a second table of contents for a second group of the plurality of groups, wherein the first table of contents and the second table of contents provide access to different web pages of the web site, and wherein the first table of contents and the second table of contents are available at a same time for the web site;
    in response to a user accessing existing content of the web site having the multiple web pages, identifying one of the first group and the second group from the plurality of groups using the list of behaviors and attributes associated with each group of the plurality of groups, wherein the identification of one of the first group and the second group changes over time;
    in response to the first group being identified at a first time, updating an existing table of contents to modify entries based on the first table of contents;

in response to the second group being identified at a second time, updating the existing table of contents to modify entries based on the second table of contents; and displaying the updated, existing table of contents.

8. The computer system of claim 7, wherein the operations further comprise:

dynamically updating the plurality of groups; and in response to the user accessing the existing content, identifying a new group from the dynamically, updated plurality of groups.

9. The computer system of claim 7, wherein the operations further comprise:

modifying the existing table of contents by at least one of adding a link and removing a link from the existing table of contents.

10. The computer system of claim 7, wherein the operations further comprise:

using social media data to identify one of the first group and the second group.

11. The computer system of claim 7, wherein a Software as a Service (SaaS) is configured to perform the operations of the computer system.

12. The computer system of claim 7, wherein the operations further comprise:

receiving a selection of one of the first group and the second group.

* * * * *